G. C. DAVISON.
AIR STARTING VALVE FOR DIESEL ENGINES.
APPLICATION FILED APR. 3, 1916.
1,204,953.
Patented Nov. 14, 1916.
2 SHEETS—SHEET 1.
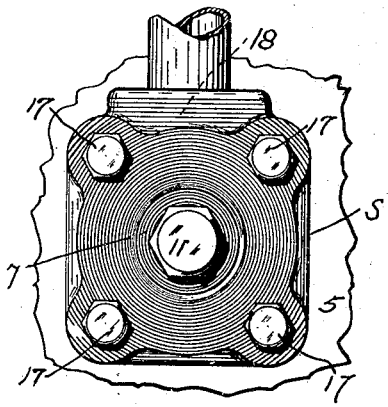
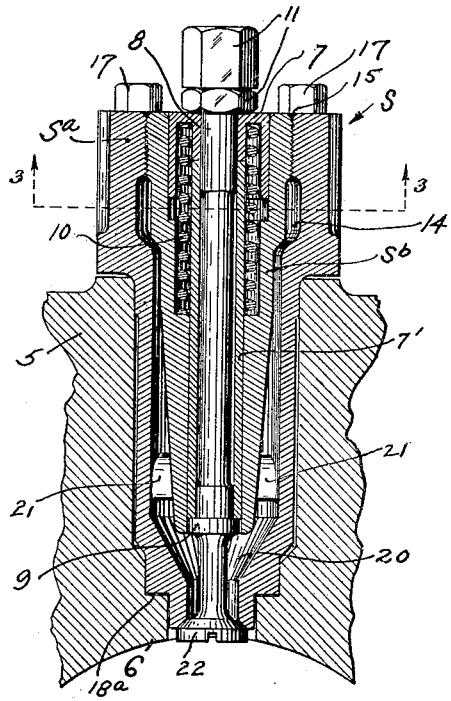
INVENTOR
G. C. Davison,
BY
ATTORNEYS.

G. C. DAVISON.
AIR STARTING VALVE FOR DIESEL ENGINES.
APPLICATION FILED APR. 3, 1916.
1,204,953.
Patented Nov. 14, 1916.
2 SHEETS—SHEET 2.
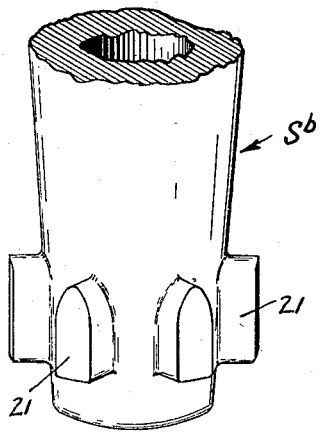
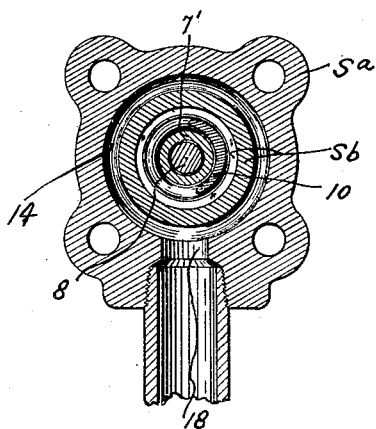
INVENTOR
G. C. Davison
BY
ATTORNEYS.

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

AIR-STARTING VALVE FOR DIESEL ENGINES.

1,204,953.

Specification of Letters Patent.

Patented Nov. 14, 1916.

Application filed April 3, 1916. Serial No. 88,558.

*To all whom it may concern:*

Be it known that I, GREGORY C. DAVISON, a citizen of the United States, and a resident of New London, in the county of New London and State of Connecticut, have invented certain new and useful Improvements in Air-Starting Valves for Diesel Engines; and I do hereby declare the following to be a full, clear, and exact description of the invention, such as will enable others skilled in the art to which it appertains to make and use the same.

This invention is directed to the provision of an improved form of air-starting valve for use on internal combustion engines in admitting compressed air to the cylinder of an engine for the purpose of starting the engine in operation.

The object of the invention is to provide a valve of this character of an improved construction with which reliable and efficient operation is obtained, which permits of regrinding the valve surfaces conveniently and with which a very simple construction of the cylinder structure for the reception of the valve may be employed.

The invention involves the provision of an air-starting valve comprising a valve-cage which consists of two tubular members fitting one within the other and forming a chamber between them and a stem adapted to reciprocate within and be guided by the inner tubular member, this stem having a valve member upon its end which is movable into and out of coaction with a valve seat upon the inner end of the outer tubular member. With a valve of this construction provision may be made for admitting air to the chamber of the valve through a transverse opening in the outer end of the outer tubular member of the valve-cage, which portion of the valve-cage lies outside of the cylinder structure when the valve is mounted in position. This characteristic of the valve structure makes it unnecessary to provide air passages in the cylinder structure which would require the use of a core during the casting operation or a difficult boring operation thereafter. Instead, the cylinder structure is merely provided with a cylindrical well or opening into which the valve-cage fits, the air connection to the valve being made outside the cylinder structure and the inner end of the valve opening into the interior of the cylinder.

Another advantageous feature of the construction forming the present invention is that the disk-valve and the valve-seat are readily accessible for the purpose of grinding; this disk and its seat are located at the extreme end of the valve so that, by removing the valve from its opening in the cylinder structure, the operations incident to re-grinding may be easily performed.

Another feature of the invention resides in the simplicity of the construction as a whole and the compact arrangement of the parts whereby the moving parts are so housed and guided as to avoid all danger of displacement thereof, as a result of which a valve is produced which is reliable and efficient in operation and which may be continued in operation for an extended period without appreciable wear.

I have illustrated the preferred embodiment of the invention in the accompanying drawings, in which—

Figure 1 is a longitudinal section of the valve; Fig. 2 is a perspective view of a portion of an inner tubular member; Fig. 3 is a transverse section on line 3—3 of Fig. 1; and Fig. 4 is a top view of the valve.

Referring to these drawings and particularly to Fig. 1, the valve structure includes a valve-cage which consists of inner and outer tubular members fitting one within the other and formed to provide a chamber between them. The valve-cage as a whole is indicated by the reference S and the two tubular members constituting the cage are indicated by the references $S^a$ and $S^b$. The valve-cage consisting of these two parts is adapted to be inserted within an opening or well provided in the cylinder casting. This cylinder casting is indicated at 5 on Fig. 1 and the interior surface of the cylinder is indicated at 6. The two tubular members are secured together by means of coacting threads on the outer end portions thereof. The inner member is slightly shorter than the outer one so that its inner end is inclosed within the inner end of the outer tubular member and the chamber 14 between the two members extends beyond the end of the inner tubular member to an inlet opening at the inner end of the inner tubular member. The inner tubular member is positioned relatively to the outer one at the inner end thereof by parts which bear upon the inner surface of the outer tubular member, but these parts are spaced so that they do not interrupt the flow of air through the valve. In Figs. 1 and 2, the inner tubular member is shown as provided with a plurality of spaced projections 21 of such size that their outer ends bear upon the interior surface of the outer tubular member. The air admitted to chamber 14 may therefore pass freely between the projections 21 to and beyond the inner end of the tubular member and into the space 20 within the inner end of the outer tubular member. This air is admitted to the chamber 14 through a transverse passage 18 extending from chamber 14 through the outer tubular member and connected to a suitable air-supply pipe.

The inner tubular member forms a guide for a valve-stem, a portion of which is preferably enlarged to form a piston whereby the valve is substantially balanced in the closed position and a spring is provided for returning the valve to the closed position after it has been opened by one of the cams of the engine. The valve-stem is shown at 8 extending entirely through the valve-cage. At its inner end it carries a valve member 22 in the form of a disk which is movable toward and away from a seat formed upon the inner end of the outer tubular member. The stem 8 is also enlarged at 9 to form a piston which is located at the inner end of the inner tubular member so that the air pressure within the chamber 14 is exerted against this piston 9 and also against the valve member 22 and results in balancing the valve in a closed position.

The valve is moved to the closed position by a spring 10 which is coiled about the valve-stem and is housed within the inner tubular member. One end of this spring bears upon a wall of the inner tubular member and the other end bears upon a cap 7 which is secured upon the stem 8 by means of nuts 11. In order to center the spring 10 and guide it in its movements, the cap 7 is given a cross-sectional shape, indicated in Fig. 1, so that it embraces one end of the spring 10. Also, a tube 7' may be provided upon the stem 8 extending from the cap 7 to the piston 9 in continuation of the inner annular wall of the cap 7 so that the spring 10 will be completely inclosed within the annular space between the parts $S^b$, 7 and 7'.

The parts of the valve so constructed may be readily assembled by merely inserting the inner tubular member within the outer one and bringing the threads thereof into engagement. If it be desired to do so, the two tubular members may be permanently secured together as by welding them together. Such welding together of the valve parts is indicated at 15. The construction of the valve is such as to permit this permanent connection of the valve parts, as separation of these parts and access to the interior of the structure of the valve-cage should never be necessary.

The valve may be readily mounted in position upon a cylinder structure by inserting it in a cylindrical well or opening such as that shown in Fig. 1, and then tightening up on nuts 17 which pass through the outer tubular member and into threaded openings in the cylinder casting. Prior to inserting the valve in the opening in the cylinder casting, a gasket $18^a$ is preferably positioned upon a transverse wall of the opening in the cylinder, as is shown in Fig. 1. The air connections having been established, air will flow through the transverse passage 18 into the chamber 14 and past the end of the inner tubular member to the disk and piston 9, and on actuation of the valve-stem against the tension of spring 10, the disk 22 will be moved from its seat to admit air to the cylinder. If at any time regrinding of the valve becomes necessary, the entire valve structure may be removed by withdrawing the bolts 17 and the disk 22 is then readily accessible.

It is to be noted in connection with the construction illustrated and described including the sleeve 7' upon the valve stem, that the wear incident to reciprocation of the valve stem within the valve-cage occurs upon parts which are detachable from the valve stem, namely, the sleeve 7' and the cap 7. By reason of this, when such wear has occurred to an objectionable extent, the parts 7 and 7' may be removed and new ones substituted therefor so that compensation for the wear does not require that a valve disk which coöperates perfectly with the valve seat and the stem on which that disk is mounted be discarded.

I claim:

1. An air-starting valve comprising the combination of a valve-cage consisting of inner and outer tubular members fitting one within the other and forming a chamber between them which extends beyond the inner end of the inner tubular member to an outlet opening at the inner end of the outer tubular member, a passage through the outer member near the outer end of the valve-cage and leading to said chamber, a valve stem adapted to reciprocate within the inner tubular member, a spring actuating the stem, and a valve member on the inner end of the stem coacting with the inner end of the outer tubular member to control the passage of air through the valve; substantially as described.

2. An air-starting valve comprising the combination of a valve-cage consisting of inner and outer tubular members fitting one within the other and forming a chamber between them which extends beyond the inner end of the inner tubular member to an outlet opening at the inner end of the outer tubular member, a plurality of projections upon the inner tubular member near the inner end thereof engaging the interior wall of the outer tubular member and spaced apart to permit the flow of air beween them, a passage through the outer member near the outer end of the valve-cage and leading to said chamber, a valve stem adapted to reciprocate within the inner tubular member, a spring actuating the stem and a valve member on the inner end of the stem coacting with the inner end of the outer tubular member to control the passage of air through the valve; substantially as described.

3. An air-starting valve comprising the combination of a valve-cage consisting of inner and outer tubular members fitting one within the other and forming a chamber between them which extends beyond the inner end of the inner tubular member to an outlet opening at the inner end of the outer tubular member, a passage through the outer member near the outer end of the valve-cage and leading to said chamber, a valve stem adapted to reciprocate within the inner tubular member, a spring coiled about the valve stem and housed within the inner tubular member, and a valve member on the inner end of the stem adapted to be moved into and out of engagement with a valve seat upon the inner end of the outer tubular member; substantially as described.

4. An air-starting valve comprising the combination of a valve-cage consisting of inner and outer tubular members fitting one within the other and forming a chamber between them which extends beyond the inner end of the inner tubular member to an outlet opening at the inner end of the outer tubular member, a passage through the outer member near the outer end of the valve-cage and leading to said chamber, a valve stem adapted to reciprocate within the inner tubular member, a cap secured to the valve stem and adapted to move with the valve stem within the inner tubular member, a spring coiled about the valve stem and housed within the inner tubular member, said spring bearing at one end upon the inner tubular member and at the other upon the cap, and a valve member on the inner end of the stem movable with the stem into and out of engagement with a valve seat formed upon the inner end of the outer tubular member; substantially as described.

5. An air-starting valve comprising the combination of a valve-cage consisting of two tubular members fitting one within the other and provided with coacting threads near their outer ends for securing them together, said members having an air-chamber between them, the outer member having a transverse aperture near its outer end leading to the chamber and a valve seat at its inner end, and the inner member having its inner end located within the outer member and above the valve seat, a valve stem adapted to reciprocate within the inner member, a spring adapted to actuate the stem, and a valve member on the stem movable therewith into and out of engagement with said seat; substantially as described.

6. An air-starting valve comprising the combination of a valve-cage consisting of two tubular members fitting one within the other and forming a chamber between them, a passage through the outer member from said chamber near the outer end of the outer tubular member, a stem reciprocating within the inner tubular member, a valve disk upon the inner end of the stem coöperating with a seat on the inner end of the valve-cage, a removable sleeve upon the valve stem and within the inner tubular member, a cap on the valve stem adapted to reciprocate within the inner tubular member, and a spring coiled about the valve stem and sleeve and housed within the inner tubular member with one end bearing upon said cap; substantially as described.

In testimony whereof I affix my signature.

GREGORY C. DAVISON.

Copies of this patent may be obtained for five cents each, by addressing the "Commissioner of Patents, Washington, D. C."